Figure 7:
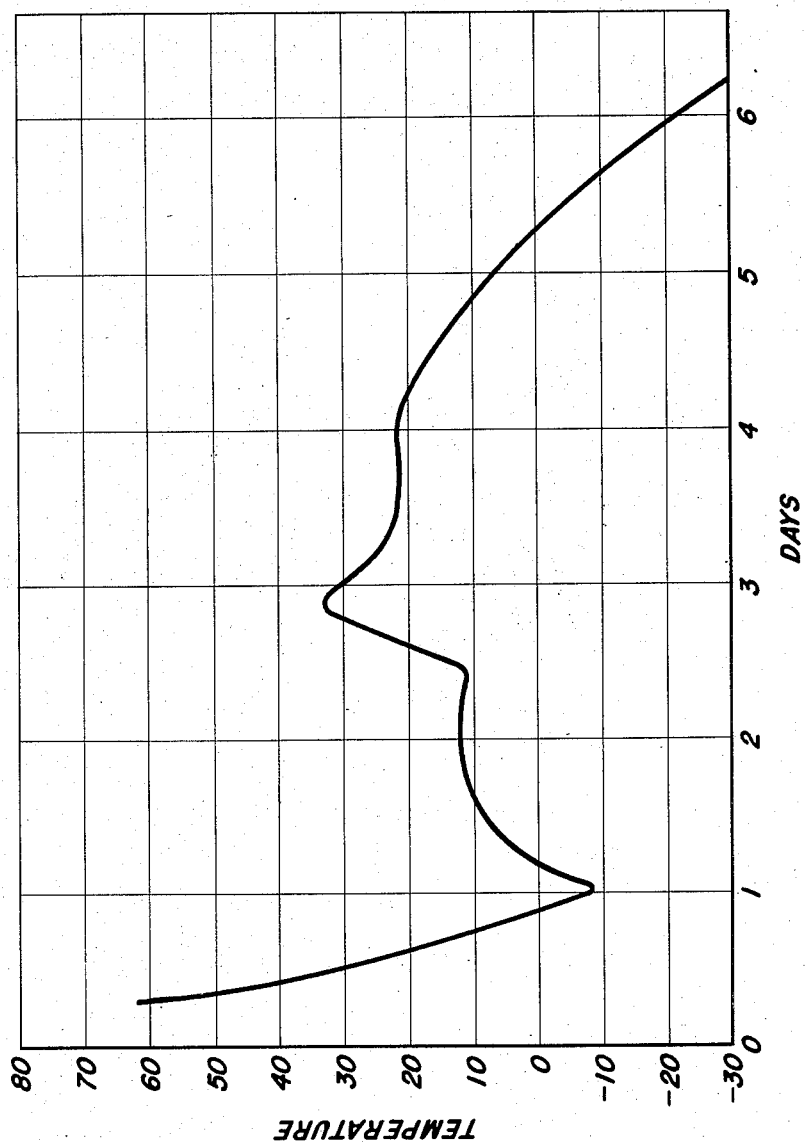

May 5, 1959 W. P. CROPPER 2,884,766
REFRIGERATED APPARATUS FOR POUR TESTING OILS
Filed Jan. 30, 1956 4 Sheets-Sheet 1
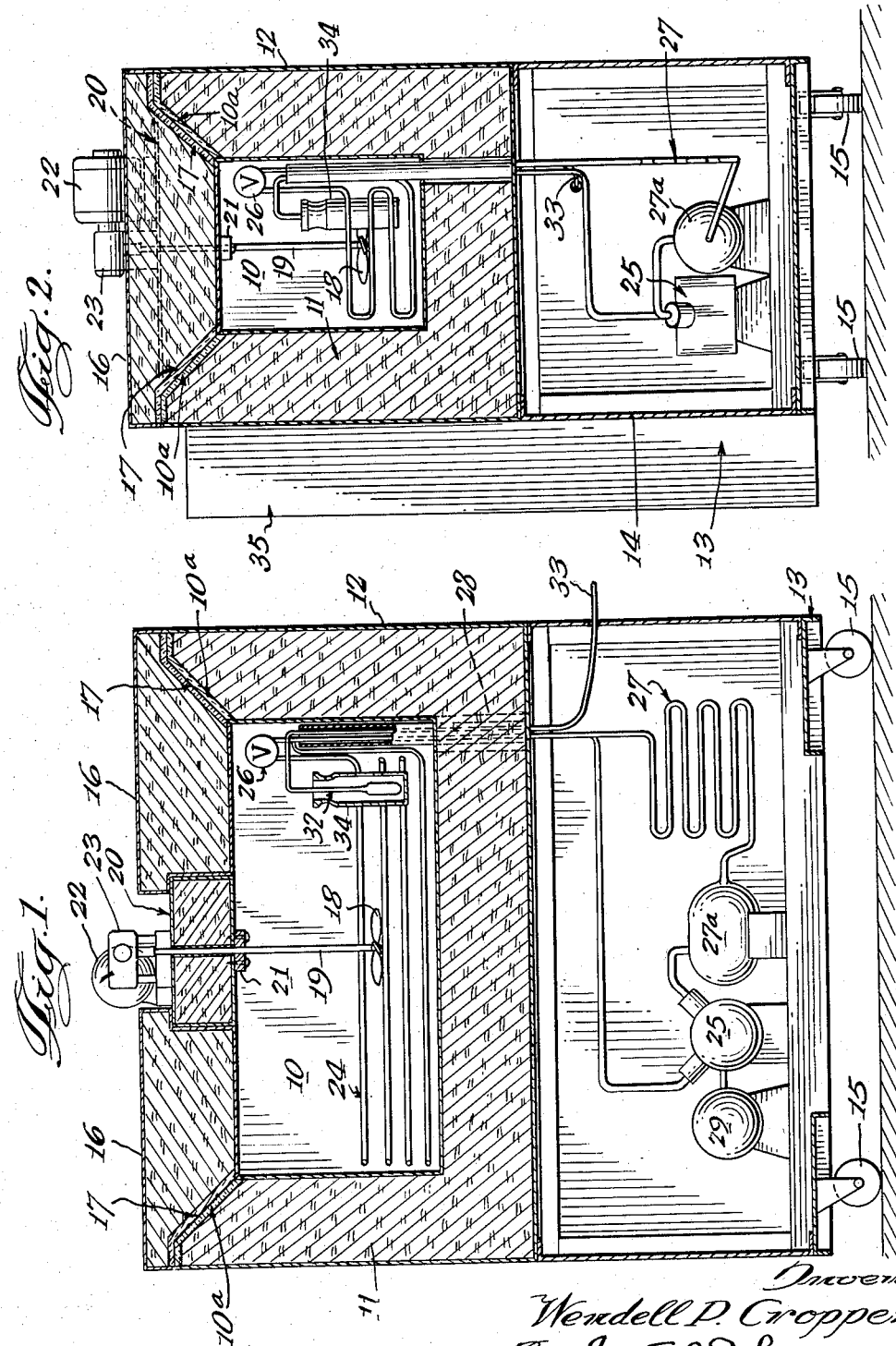
Inventor
Wendell P. Cropper
By Everett A. Johnson
Attorney May 5, 1959 W. P. CROPPER 2,884,766
REFRIGERATED APPARATUS FOR POUR TESTING OILS
Filed Jan. 30, 1956 4 Sheets-Sheet 2
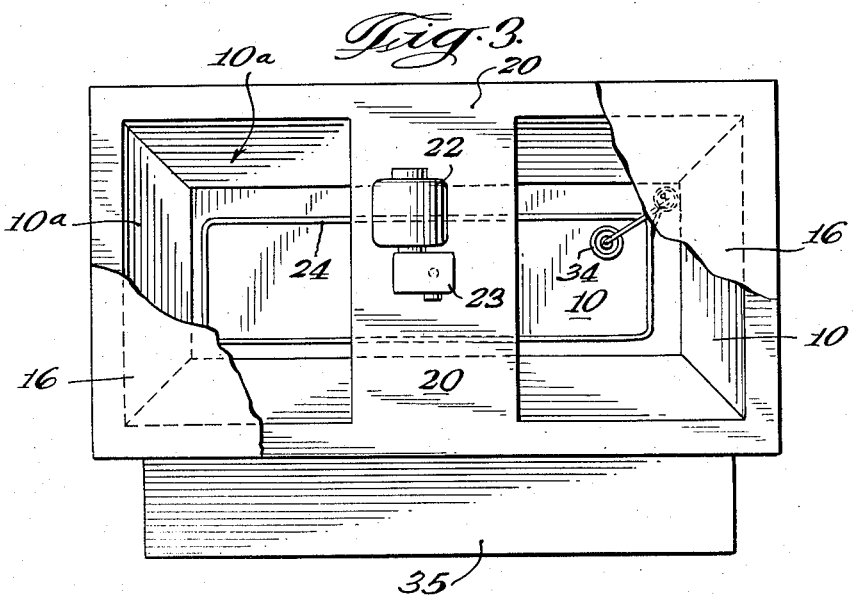
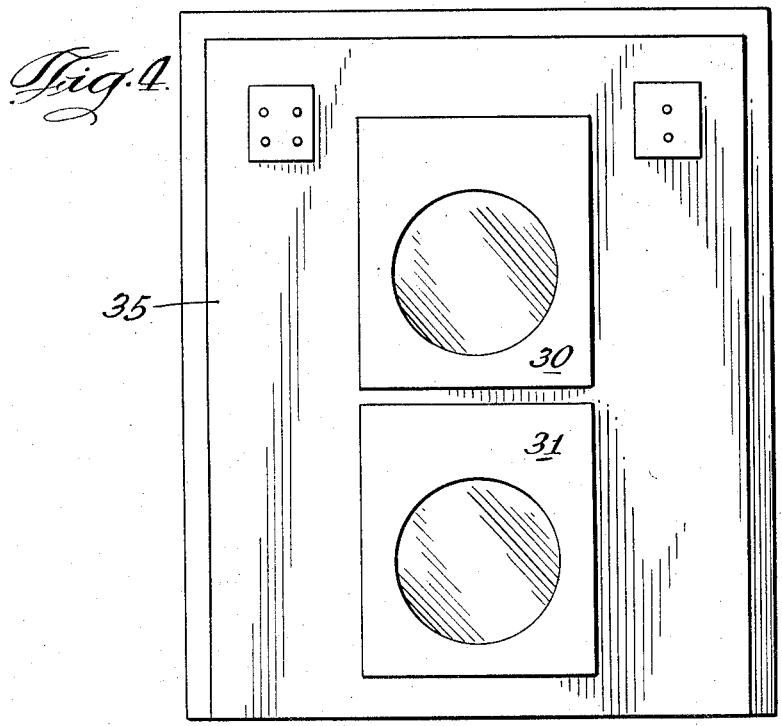
Inventor
Wendell P. Cropper
By Everett A. Johnson
Attorney

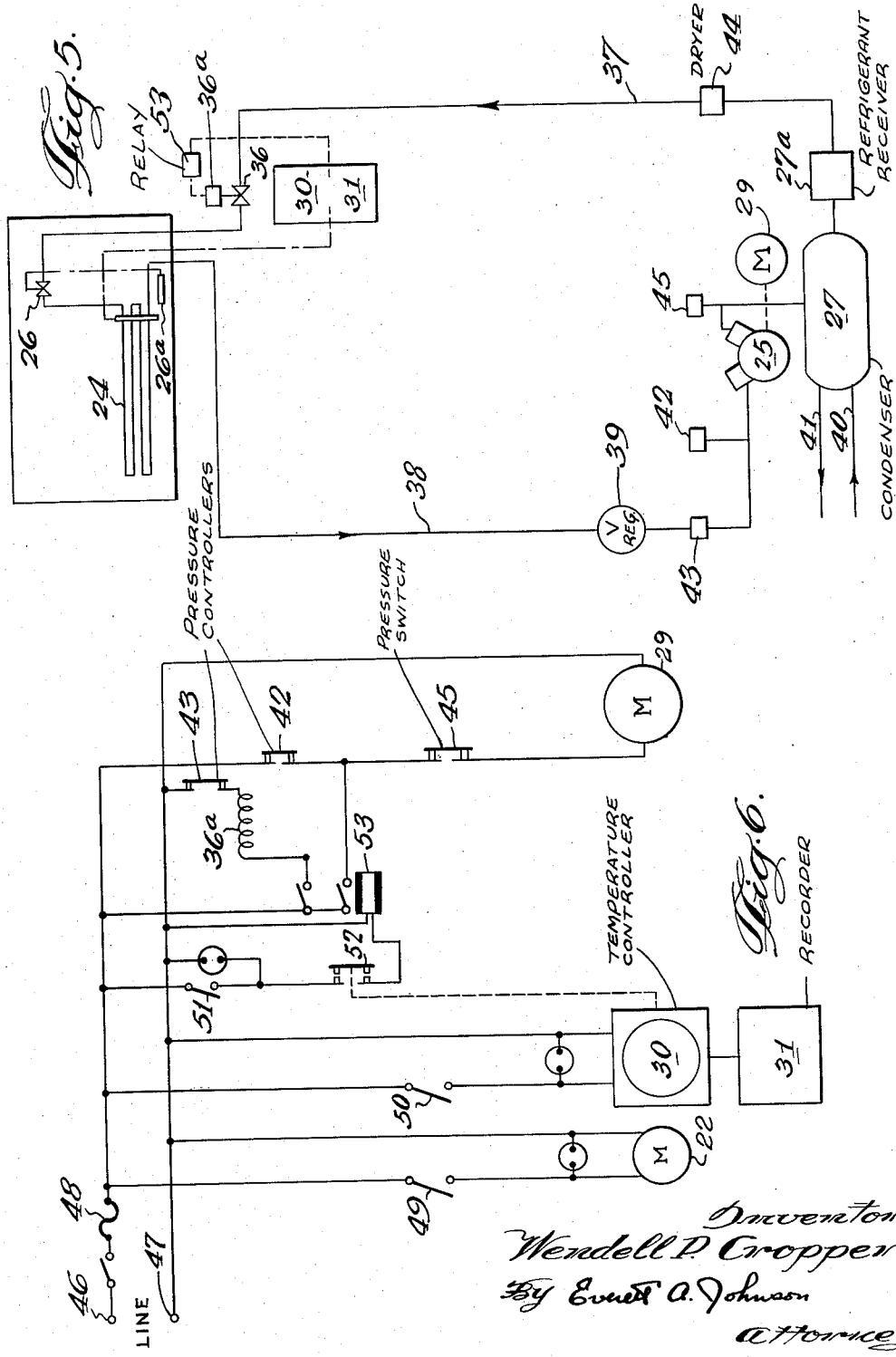

May 5, 1959 W. P. CROPPER 2,884,766
REFRIGERATED APPARATUS FOR POUR TESTING OILS
Filed Jan. 30, 1956 4 Sheets-Sheet 4

INVENTOR.
Wendell P. Cropper
BY Everett A. Johnson
Attorney

United States Patent Office 2,884,766
Patented May 5, 1959

2,884,766

REFRIGERATED APPARATUS FOR POUR TESTING OILS

Wendell P. Cropper, Lansing, Ill., assignor to Standard Oil Company, Chicago, Ill., a corporation of Indiana Application January 30, 1956, Serial No. 562,204

4 Claims. (Cl. 62—130)

This invention relates to an apparatus for carrying out pour tests on oil samples. More particularly, the invention pertains to an apparatus for conducting cyclic pour tests in accordance with the ASTM procedure.

According to ASTM "Proposed Method of Test for Pour Stability Characteristics of Winter Grade Motor Oils," referred to as "Cycle C" pour test (see ASTM Standards on Petroleum Products and Lubricants (1950), page 696), the oil samples are placed in four-ounce glass bottles and supported on trays within a suitable bath wherein the temperature is varied according to a particular program or cycle.

In making the "Cycle C" pour test, the specified temperature schedule is indicated by the chart in Figure 7. Apparatus in which the "Cycle C" pour test is conducted should follow this temperature schedule within an accuracy of about ±3° F.

My invention pertains to the design and operation of the bath for use in connection with the aforesaid test and procedure.

It is, therefore, a primary object of my invention to provide an apparatus for automatically conducting a cyclic pour test on winter grade lube oils. Another object of my invention is to provide a method and means for performing the cyclic pour test on a multiplicity of samples with a minimum of manual operation. Still another object of the invention is to provide an apparatus which is of rugged construction, is foolproof in operation and which may be operated without intensive technical or specialized training. These and other objects of my invention will become apparent as the description thereof proceeds.

Briefly, I attain the objects of my invention by providing an insulated compartment containing a scourge bath, the temperature of the liquid in the bath being controlled by means of a programed controller which provides a selected temperature schedule.

Further details of construction and the mode of operation of my apparatus will be described by reference to the accompanying drawings illustrating a preferred embodiment of the invention and wherein:

Figure 1 is an elevation partly in section;
Figure 2 is a section taken along the line 2—2 in Figure 1;
Figure 3 is a plan view of the apparatus in Figure 1;
Figure 4 is an elevation of the instrument panel;
Figure 5 is a flow diagram of the refrigeration system;
Figure 6 is the wiring diagram; and
Figure 7 is a chart indicating the temperature schedule.

In the drawings, the compartment 10 is a stainless steel vessel about 11 inches wide, 30 inches long and 14 inches deep giving a liquid capacity of about 10 gallons to the indicated liquid level. This vessel 10 is ensheathed in 6 inches of cork insulation 11. The outer shell 12 is also of stainless steel and is separated from compartment 10 by means of the insulating panels 10a. The bath assembly is supported on carriage 13 comprised of frame 14 and rubber tire casters 15.

Access to vessel 10 is through covers 16 which are of hollow stainless steel construction and filled with cork insulation. Insulation breaker strips 17, similar to the panels 10a joining the shell 12 and the inner compartment 10, are provided. The bath liquid is stirred by mixer impeller 18 mounted on impeller shaft 19 which passes through support 20 and the stirring shaft bearing 21 fixed to the lower side of the support 20. The shaft 19 is driven by motor 22 through speed reducer 23. The mixer impeller 18 is fixed to the lower end of the impeller shaft 19 extending 13 inches below the mounting base 20 and about 1 inch above the bottom of the vessel 10.

The bath liquid in compartment 10 is cooled by a refrigerant circulated through copper cooling coil 24 which comprises a number of turns of ⅜ inch O.D. x 0.032 inch wall copper tubing.

The basic refrigeration system comprises a modified two stage, four cylinder compressor 25, a condenser 27, thermostatic expansion valve 26 and coil 24, with the end of the cooling coil returned to the compressor 25. The refrigeration cycle begins in the first stage of the compressor 25 and proceeds as follows:

(1) Gas is compressed to approximately 80 p.s.i. in the first stage;
(2) Gas is further compressed in the second stage to about 125 p.s.i.;
(3) Work done on the gas during the compression cycle increases its temperature and the compressed gas enters the condenser 27 where it is cooled and condensation occurs (vapor becomes saturated);
(4) Gas is expanded through cooling coil 24 during which process heat is removed from the liquid in the bath 10;
(5) The expanded gas containing the heat removed from the bath liquid in compartment 10 is returned to the compressor 25; and
(6) Gas is again compressed and condensed, the heat removed from the bath liquid being taken from the gas in the condenser 27 thereby completing the cycle.

One end of the coil 24 is connected to condenser 27 through thermostatic expansion valve 26 while the other end of coil 24 is connected through suitable controls to compressor 25 which is operated by electric motor 29. Conduit 28 extending through outer shell 12, the cork insulation 11 and the vessel 10 carries the tubing connections between the coil 24 and the compressor 25.

Temperature control of the liquid in vessel 10 is effected by controller-recorder 30—31 which is of the program temperature controller type. The temperature controller includes a temperature program cam designed to vary the cooling temperatures within the bath according to a selected time-temperature relationship required for conducting a pour test. Thus the controller may include a 24-hour temperature cam and the recorder a 7-day circular chart. The probe 32 which is attached to the controller 30 by means of a flexible tube 33 passing through the conduit 28, is a liquid-vapor thermometer disposed within a bottle 34 and senses the temperature of the liquid in vessel 10. If desirable, the probe may be placed directly in the bath liquid for more efficient control of the temperature of the bath liquid. The temperature controller-recorder 30—31 is mounted on the instrument panel 35 which may be supported on the frame 14.

Referring to Figure 5, the controller 30 is equipped with a 24-hour cam drive which controls the solenoid liquid line valve 36 on liquid line 37 connected to the cooling coil 24 disposed within the vessel 10. On line 37 is also provided the thermostatic expansion or discharge valve 26 which has its sensing unit 26a within the bath 10.

The refrigerant flows through suction line 38 through the suction regulator valve 39 into the compressor 25 which discharges into the condenser 27 which is cooled by water circulated into the condenser 27, by inlet line 40 and outlet line 41. Vessel 27a is a receiver for liquid refrigerant (or storage tank). Pressure switches 42 and 43 are provided on suction line 38, low pressure control 42 maintaining low crank case pressure and reverse acting low pressure control 43 operating solenoid valve 36 and maintaining low suction pressure at high bath temperatures. The refrigerant from condenser unit 27 is then recycled through dryer 44 and line 37 by way of solenoid valve 36 and expansion valve 26 to coil 24. High pressure switch 45 is connected to condensing unit 27 and controls the compressor 25 so that the motor 29 is shut off if the flow of water to the condenser 27 is interrupted.

The electrical controls are schematically shown in Figure 6. The power supply, which may be 115 volt A.C., is supplied by leads 46 and 47 to the stirring motor 22 by closing breaker 48 and stirring motor toggle switch 49. The controller-recorder 30—31 is operated by closing switch 50 and the compressor 25 by closing switch 51.

The switch 52 is a part of the temperature controller 30 and is closed upon demand by the temperature control system. As this switch 52 is closed, the relay 53 will operate provided the compressor switch 51 on control panel 35 is closed. When relay 53 operates, two circuits are energized; (1) a circuit is completed through high pressure switch 45 which is normally closed thus causing the motor 29 to run; and (2) a circuit is completed through the coil of the liquid line solenoid coil 36a and through the contact of low pressure switch 43 which is a reverse acting switch. Demand switch 52 will open when equilibrium is established in the bath liquid and as a consequence circuits (1) and (2) will be opened.

At this point, the compressor motor 29 may continue to run; the low pressure switch 42 may be closed, in which case a 115 volt A.C. circuit is completed through the windings of the compressor motor 29. The motor 29 will continue to run until the crank case pressure is reduced to a point at which the circuit through the motor 29 is broken by switch 42 thus causing the motor 29 to stop. The range of the control 42 is 20" vac. to 80 p.s.i. and on the cyclic pour bath described herein this control 42 is set to close at 26 p.s.i. and to open at about 20" vac.

When the bath is connected to a 115 volt A.C. line but compressor switch 51 is open, then the motor 29 will operate through low pressure switch 42 to keep the crank case pressure low so that the motor 29 and the compressor 25 will not be overloaded when a cyclic pour test is started.

Circuit (2) is concerned with relay 53, liquid line solenoid coil 36a and low pressure, reverse acting switch 43. When relay 53 is actuated by demand switch 52, the solenoid coil 36a is energized by one set of contacts of relay 53. Assuming that low pressure, reverse acting switch 43 is closed, then when the solenoid valve 36 is actuated, liquid refrigerant is admitted to the cooling coil 24 through thermostatic expansion valve 26. As the liquid refrigerant vaporizes, the pressure will tend to build up in the cooling coil 24 and when the pressure reaches 5 p.s.i. the contacts of the low pressure, reverse acting switch 43 open thereby deenergizing the solenoid coil 36a so that the flow of refrigerant into the cooling coil 24 is interrupted by the closing of valve 36. This action prevents the build up of excessive pressures in the cooling coil 24. When the pressure falls to 15 inches of mercury, the contacts of switch 43 close so that the solenoid coil 36a can again be energized through contacts of the relay 53.

Switch 45 is a protective device which is actuated in the event that the flow of water to the condenser 27 is interrupted which would eventually load the compressor 25 excessively. Therefore, at 200 p.s.i. switch 45 opens to break the motor circuit so that motor 29 does not run. The action of compressor switch 51 has been described above and unless this switch is in the "on" position no refrigeration is possible. The temperature controller 30 operates through switch 50 and the stirring motor 22 runs when switch 49 is in the "on" position.

In my system, a heater will not ordinarily be required for the cycle C temperature schedule. However, if needed, a small heater (not shown) can be installed in the bath 10 for other than cycle C temperature schedules.

Although I have described my apparatus with respect to a preferred embodiment thereof illustrated in the drawings, it is to be understood that this is by way of example only. Accordingly, it is contemplated that modifications can be made in the apparatus and in the mode of using the apparatus without departing from the spirit and scope of my invention.

What I claim is:

1. A refrigerated apparatus adapted for use in pour testing of lubricating oils which comprises in combination an open-topped vessel of rectangular cross-section, an open-topped outer shell of substantially greater cubic displacement than the displacement of said vessel, said vessel being disposed within said outer shell, a carriage supporting said outer shell, massive heat insulation material arranged between the walls of said vessel and the walls of said shell, a bridge wall across the open top of said shell, said bridge wall being heat insulated and dividing the open top of the inner vessel to provide two ports on either side of said bridge wall, removable insulated covers for said ports, downwardly and inwardly inclined seats about said ports, heat insulating breaker strips providing inclined seats about said ports for the sealing edges of said covers, refrigeration means mounted on said carriage below said shell, cooling coil means within said vessel refrigerated by said refrigeration means, stirrer means disposed within said vessel and supported between said ports by said bridge wall, instrument panel means mounted on said carriage and shell, and temperature controller-recorder means arranged to monitor the temperature maintained within said vessel and to control the refrigeration of the cooling coils, said temperature controller-recorder means being supported in said instrument panel means.

2. A refrigerated apparatus adapted for use in pour testing of lubricating oils which comprises in combination a carriage body, an open-topped shell of rectangular cross-section on said body, a vessel in said shell, said vessel being of substantially smaller cubic displacement than the displacement of said shell and being wholly within said outer shell but spaced from the walls thereof, insulation material in the space between said vessel and shell and supporting said vessel therein, a narrow bridging wall across a minor portion of the open top of said vessel and dividing the open top of the said vessel so as to provide two ports, removable insulated covers for said ports having substantial thickness and downwardly and inwardly inclined side walls, heat-insulating breaker strips extending outwardly and upwardly from the top edge of the said vessel to provide heat-insulated seats for said covers, refrigeration means mounted on said carriage below said shell, cooling coil means within said vessel refrigerated by said refrigeration means, stirrer means disposed within said vessel and supported between said ports by said bridging element, instrument panel means mounted on said carriage and co-extensive with said shell, and temperature controller recorder means arranged to monitor the temperature maintained within said vessel and to contol the refrigeration of the said cooling coil means, said temperature controller recorder means being supported in said instrument panel means.

3. A refrigerated apparatus adapted for use in pour testing of lubricating oils which comprises in combination an open-topped vessel, an open-topped outer shell of substantially greater cubic displacement than that of said vessel, said vessel being disposed within said outer shell, massive heat insulation material arranged between said vessel and said shell, a bridge wall across the open top of said shell, said bridge wall being heat-insulated and dividing the open top of the inner vessel to provide two ports on either side of said bridge wall, removable heat-insulated covers for said ports, heat-insulating breaker strips disposed between said covers and said ports, refrigeration means mounted below said shell, cooling coil means within said vessel adapted to be refrigerated by said refrigeration means, agitation means disposed within said vessel below said bridge wall, instrument panel means carried by a wall of said shell, and temperature controller recorder means arranged to monitor the temperature maintained within said vessel and to control the refrigeration of the cooling coils in response to such monitoring, said temperature controller recorder means compising a portion of said instrument panel means.

4. The appartus of claim 3 wherein the temperature controller recorder means includes a temperature program cam designed to vary the cooling temperature within the vessel according to a selected time-temperature relationship for the pour testing of lubricating oils.

References Cited in the file of this patent

UNITED STATES PATENTS

| | | |
|---|---|---|
| 2,050,192 | Melcher et al. | Aug. 4, 1936 |
| 2,406,080 | Laird | Aug. 20, 1946 |
| 2,414,061 | Richard et al. | Jan. 7, 1947 |
| 2,455,162 | Donnelly | Nov. 30, 1948 |

OTHER REFERENCES

Committee Report on Proposed Method of Test for Pour Stability Characteristics of Winter Grade Motor Oils, Proceedings of A.S.T.M., volume 50, pp. 295–298.